(12) United States Patent
Lin et al.

(10) Patent No.: US 8,284,871 B2
(45) Date of Patent: Oct. 9, 2012

(54) SYNCHRONIZATION DETERMINING CIRCUIT, RECEIVER INCLUDING THE SYNCHRONIZATION DETERMINING CIRCUIT, AND METHOD OF THE RECEIVER

(75) Inventors: Tzuo-Bo Lin, Taipei (TW); Bing-Juo Chuang, Kaohsiung (TW); Yu-Pin Chou, Miao-Li Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 480 days.

(21) Appl. No.: 12/501,959

(22) Filed: Jul. 13, 2009

(65) Prior Publication Data
US 2010/0014621 A1    Jan. 21, 2010

(30) Foreign Application Priority Data
Jul. 15, 2008 (TW) .............................. 97126743 A

(51) Int. Cl.
*H04L 27/22* (2006.01)

(52) U.S. Cl. ..................................... 375/326

(58) Field of Classification Search .................. 375/326, 375/327, 340, 341, 344, 354, 371, 373; 327/141, 327/160; 455/182.1, 182.2, 183.1, 183.2
See application file for complete search history.

(56) References Cited

U.S. PATENT DOCUMENTS

| 7,991,296 | B1* | 8/2011 | Johnston et al. | ............. 398/154 |
| 2002/0190751 | A1* | 12/2002 | Lee et al. | .................. 326/39 |
| 2005/0218984 | A1* | 10/2005 | Yin | ............................ 330/257 |

FOREIGN PATENT DOCUMENTS
CN    1543100    11/2004
* cited by examiner

*Primary Examiner* — Young T. Tse
(74) *Attorney, Agent, or Firm* — Thomas, Kayden, Horstemeyer & Risley, LLP

(57) ABSTRACT

A receiver includes; a recovery circuit for receiving an input signal, and generating a data signal and a recovery clock; a processing circuit for processing the data signal to generate a processed signal; and a synchronization determining circuit for determining a synchronization state of the recovery clock according to the processed signal and a first reference value. The data signal includes a synchronous pattern, and the first reference value corresponds to at least a portion of a value in the synchronous pattern processed by the processing circuit. A method of the receiver is also disclosed.

20 Claims, 5 Drawing Sheets

US 8,284,871 B2

SYNCHRONIZATION DETERMINING CIRCUIT, RECEIVER INCLUDING THE SYNCHRONIZATION DETERMINING CIRCUIT, AND METHOD OF THE RECEIVER

CROSS-REFERENCE TO RELATED APPLICATION

This application claims priority of Taiwanese Application No. 097126743, filed on Jul. 15, 2008, the contents of which are incorporated herein by reference.

BACKGROUND OF THE INVENTION

1. Field of the Invention

The present invention relates to clock and data recovery (CDR) technology, more particularly to CDR technology for a signal transmission system.

2. Description of the Related Art

In many serial transmission systems, such as those that utilize USB, USB2.0, PCI-Express I and II, Serial-ATA I and II, and DisplayPort interfaces, a transmitter first combines a clock signal and data into an encoded signal for transmission, then a receiver analyzes the received encoded signal using a clock and data recovery (CDR) circuit so as to obtain a recovery clock having a frequency and a phase synchronous with the transmitter clock, thereby allowing the transmitted data to be accurately decoded.

Hence, whether or not a receiver can accurately decode received signals is determined by the recovery clock. Conventionally, a circuit for confirming a recovery clock utilizes a clock having a fixed frequency, such as a crystal clock, to assist in confirmation. Such confirmation involves first measuring the number of cycles of the crystal clock and the number of cycles of the recovery clock within a predetermined time period, and then determining whether the frequency of the recovery clock falls within a reasonable range of the clock in the transmitter. For example, with reference to FIG. 1, there are an x-number of crystal clock cycles ($T_x$) and a y-number of transmitter clock cycles within a predetermined time period (P). If a z-number of recovery clock cycles in the predetermined time period (P) is larger than (y), this indicates that the frequency of the recovery clock ($z/(xT_x)$) is too high and must be decreased. On the other hand, if the z-number of recovery clock cycles in the predetermined time period (P) is smaller than (y), this indicates that the frequency of the recovery clock ($z/(xT_x)$) is too low, and must be increased.

However, through use of such a technique, it may only be determined whether the frequency of the recovery clock falls within a reasonable range, and it is not possible to effectively confirm whether the recovery clock is accurately locked so as to realize synchronized frequency and phase.

SUMMARY OF THE INVENTION

Therefore, one of the objects of the present invention is to provide a synchronization determining circuit that is capable of accurately determining a synchronization state of a recovery clock, a receiver Including the synchronization determining circuit, and a method of the receiver.

According to one aspect, the receiver of this invention includes: a recovery circuit for receiving an input signal, and generating serial data and a recovery clock; a processing circuit coupled to the recovery circuit, and processing the serial data to generate a processed signal; and a synchronization determining circuit for determining a synchronization state of the recovery clock according to the processed signal and a first reference value. The serial data includes a synchronous pattern, and the first reference value corresponds to at least a portion of a value in the synchronous pattern processed by the processing circuit.

According to, another aspect, the synchronization determining circuit of this invention is adapted to be disposed in a receiver having a processing circuit. The synchronization determining circuit is used to determine a synchronization state of a recovery clock and includes: a comparison unit coupled to the processing circuit, and generating at least one comparison signal according to a processed signal and at least one reference value; and a determining unit coupled to the comparison unit, and generating a synchronization state signal according to at least one comparison signal. The synchronization state signal is used to indicate the synchronization state of the recovery clock, and the processing circuit is used to receive and process serial data to generate the processed signal.

According to yet another aspect, the method of this invention is for determining a synchronization state of a clock of an input signal, and includes: receiving the input signal; generating serial data and a recovery clock according to the input signal; decoding the serial data to generate a decoded signal; and determining a synchronization state of the recovery clock according to the decoded signal and at least one reference value. The serial data includes a synchronous pattern, and the at least one reference value includes a first reference value which corresponds to at least a portion of a first value in the synchronous pattern generated through decoding.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In many serial transmission systems, such as those that utilize USB, USB2.0, PCI-Express I and II, Serial-ATA I and II, and Display_Port interfaces, a transmitter sends an encoded signal including at least one frame, and a plurality of consecutive synchronous patterns are carried In an initial period of each frame for identification by a receiver. A receiver of this invention uses decoding of the synchronous patterns for confirmation of synchronization. There are different types of synchronous patterns, such as the ANSI (American National Standards Institute) 8B/10B encoded value D10.2 (i.e., 10'b 0101010101), or the ANSI 8B/10B encoded value D5.2 (i.e., 10'b 1010010101). (It may be observed that the notation "10'b 0101010101" refers to a notation that may be used for a hardware description language, such as Verilog, where "b" represents that the number is a binary number, the number "10" in this example refers to the width of the number in bits, and the value of the binary number is "0101010101.") In these examples, the synchronous patterns have a continuously transforming characteristic. The description to follow is based on an example in which PCI-Express I and II interfaces are used.

In a transmission system with a PCI-Express I/II interface, when transmission begins, a first training symbol is first sent, after which a second training signal is sent. D10.2 is sent from a sixth training symbol to a fifteenth training symbol in a first training symbol period, and similarly, D5.2 is sent from a sixth training symbol to a fifteenth training symbol in a second training symbol period. When the receiver receives the training symbols, since the state may or may not be synchronized, the received D10.2 may have two states (i.e., 10'b 0101010101 and 10'b 1010101010), and the received D5.2 may have six states (i.e., 10'b 1010010101, 10'b 0100101010, 10'b 1001010101, 10'b 0010101010, 10'b 0101010101, and 10'b 1010101010). Therefore, in order to determine the states of D10.2 and D5.2, two and six comparators (a total of eight comparators) are needed, respectively, to allow for accurate determinations. Since the procedures associated with each of D10.2 and D5.2 are the same, only the procedures related to D10.2 will be described in the following by way of example.

Figure 1:
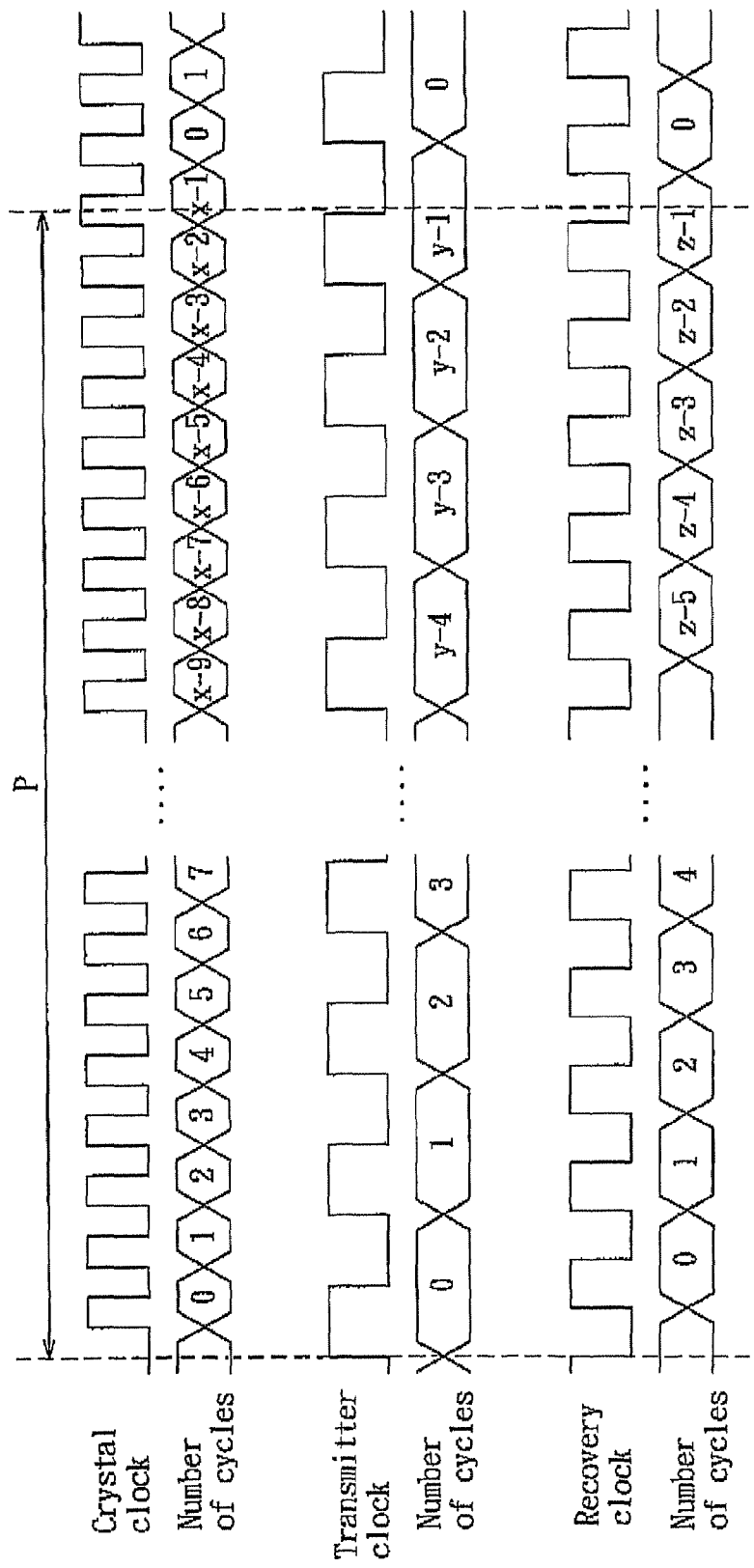
FIG. 1 is a timing diagram, illustrating the number of cycles within a predetermined time period for various exemplary clock signals which include a crystal clock, a transmitter clock, and a recovery clock.
Figure 2:
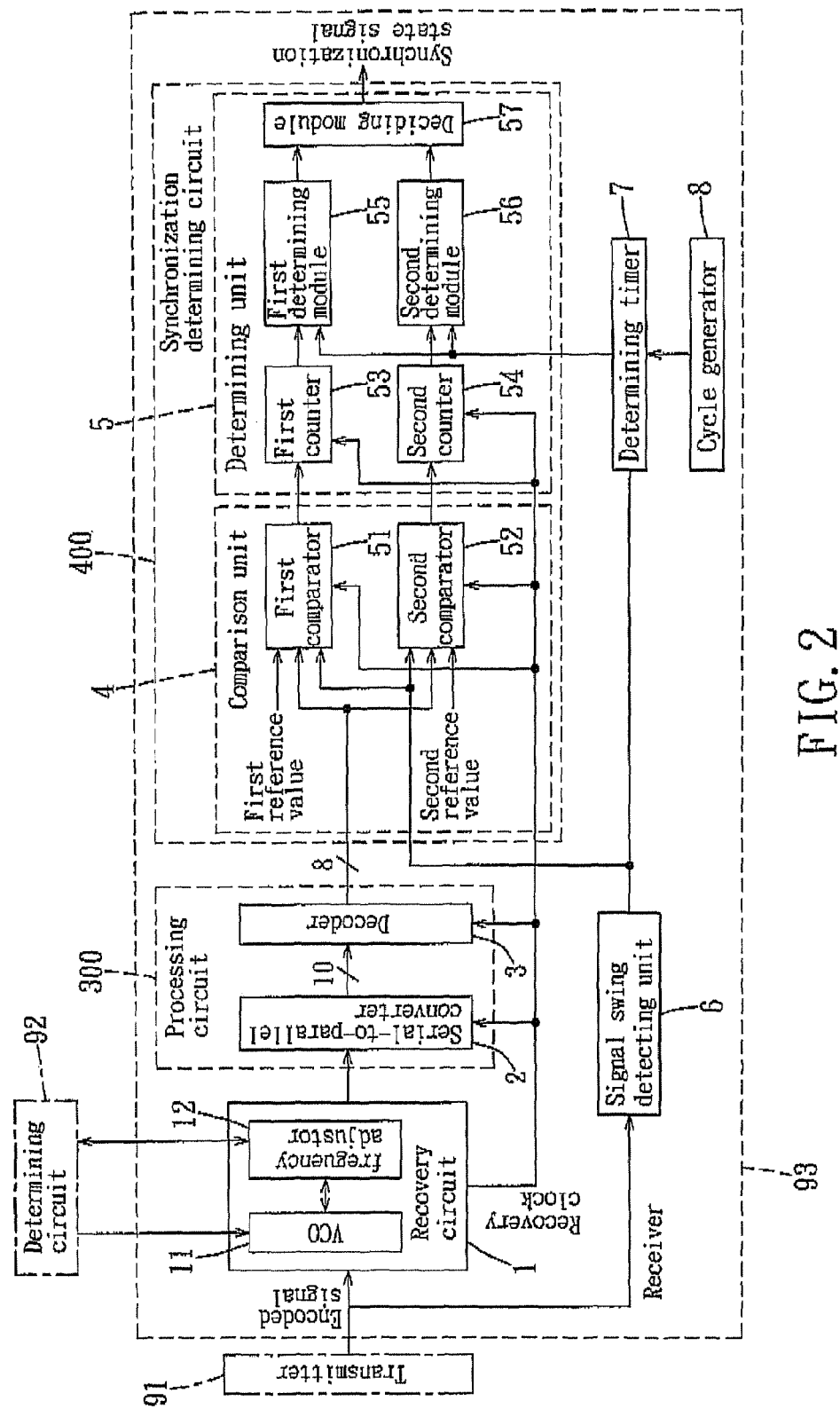
FIG. 2 is a block diagram of a receiver according to a preferred embodiment of the present invention.
Figure 3:
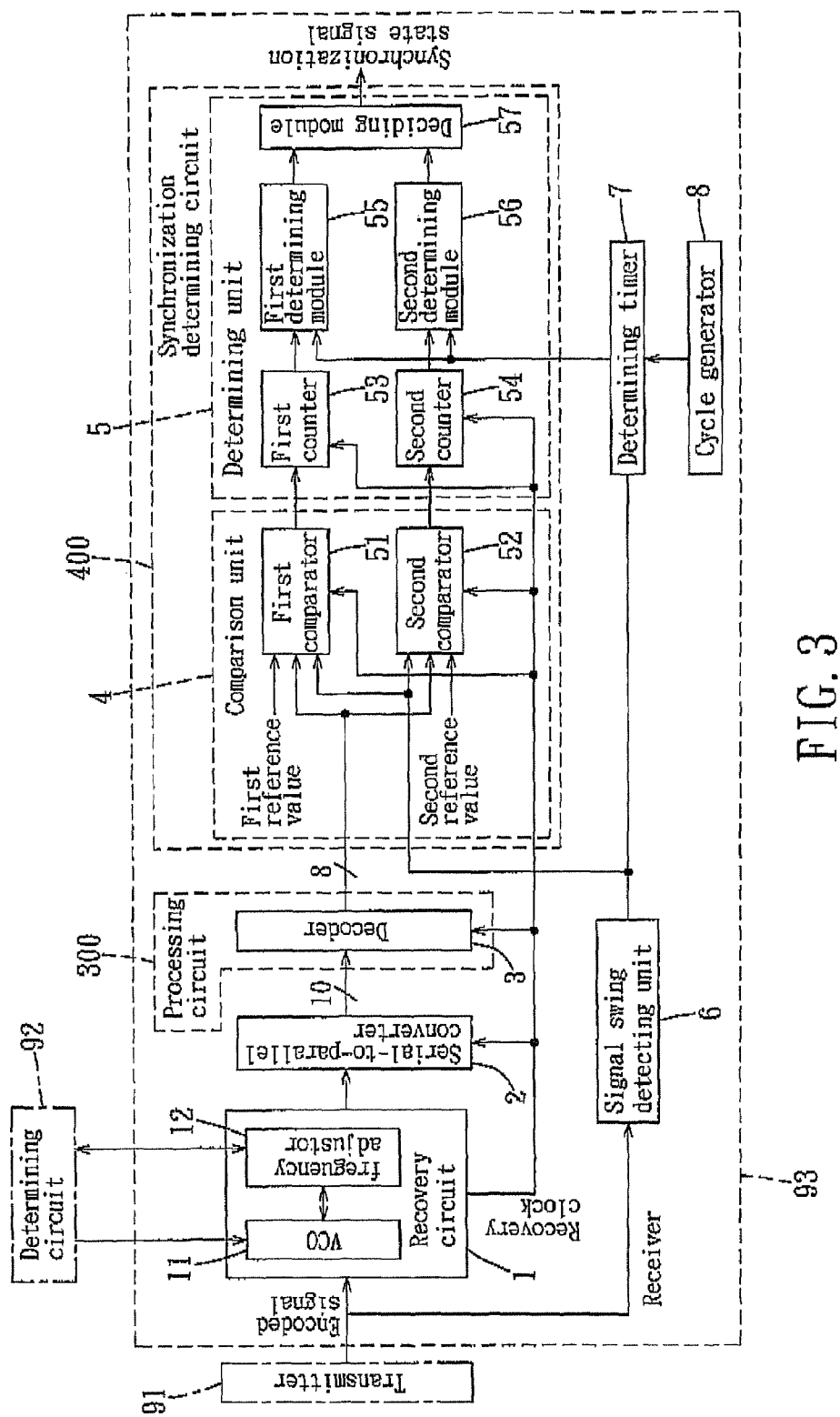
FIG. 3 is a block diagram of a modified example of the receiver of FIG. 2.

Referring to FIG. 2, a receiver 93 according to a preferred embodiment of the present invention includes a recovery circuit 1, a processing circuit 300, and a synchronization determining circuit 400 which are coupled in this sequence. In this embodiment, the recovery circuit 1 is a clock and data recovery (CDR) circuit. In an embodiment, the processing circuit 300 includes a serial-to-parallel converter 2 and a decoder 3. The decoder 3 is an ANSI 8B/10B is decoder in this embodiment. In other embodiments, the decoder 3 may be a filter circuit or a demodulation circuit. In a modified example of the preferred embodiment, with reference to FIG. 3, the serial-to-parallel converter 2 is configured as a separate component of the receiver 93 that is independent of the processing circuit 300. The synchronization determining circuit 400 includes a comparison unit 4 and a determining unit 5 coupled to the determining unit 4. The comparison unit 4 includes a first comparator 51 and a second comparator 52. The determining unit 5 includes a first counter 53, a second counter 54, a first determining module 55, a second determining module 56, and a deciding module 57. In some embodiments, the receiver 93 further includes a signal swing detecting unit 6, a determining timer 7, and a cycle generator 8. The coupling relationship of the components of the receiver 93 is as shown in FIG. 2. A method according to this invention is executed by the receiver 93, and details of the method will become evident from the description of each component of the receiver 93 as provided below.

Figure 4:
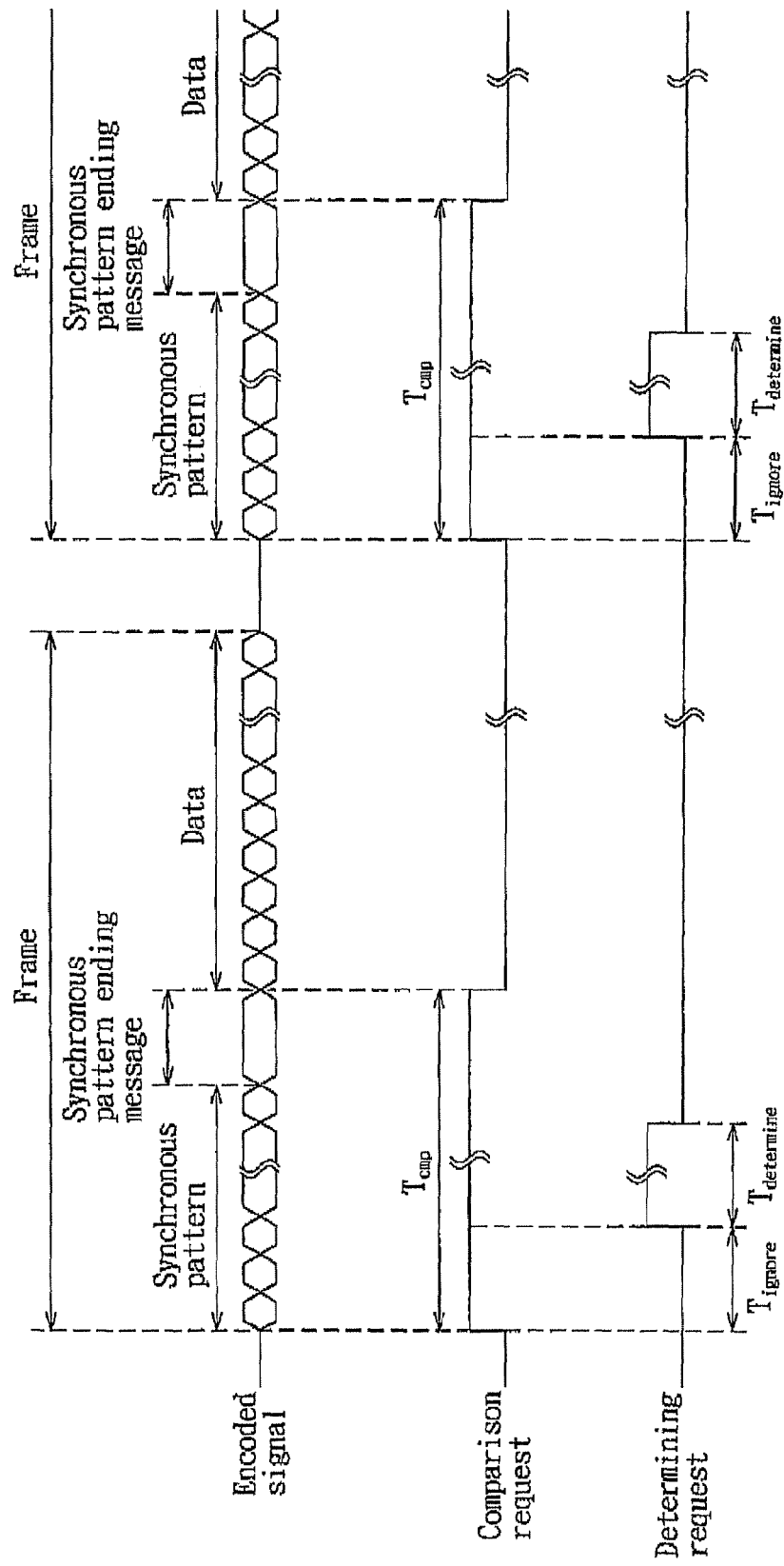
FIG. 4 is a schematic diagram, illustrating the relationship among an encoded signal, a comparison request, and a determining request according to a preferred embodiment of the present invention.

Referring to FIG. 4, each frame of the encoded signal further carries a synchronous pattern ending message that follows the synchronous patterns, and the encoded signal is in an idle state during a period when no frame is sent. In some embodiments, in order to effectively indicate the position of the synchronous patterns, the signal swing detecting unit 6 causes a comparison period ($T_{cmp}$) of a comparison request to start when the encoded signal is changed from an idle state to a swing state, and to end when the synchronous pattern ending message is detected.

Since the receiver 93 is usually not synchronized in an initial period of transmitting the synchronous patterns, the determining timer 7 will wait for an ignore period ($T_{Ignore}$) after detecting a transition point (i.e., a rising edge) of the comparison request, then causes a determining request to maintain a high level for a certain determining period ($T_{determine}$), and subsequently causes the determining request to stay at a low level for the remaining time. The determining period ($T_{determine}$) has a length that is approximately (K) times a signal cycle generated by the cycle generator 8. It is to be noted that a sum of the ignore period ($T_{Ignore}$) and the determining period ($T_{determine}$) must be smaller than the comparison period ($T_{cmp}$), so as to avoid overlapping of the determining period ($T_{determine}$) and the transmitting time of the synchronous pattern ending message.

Referring back to FIG. 2, the recovery circuit 1 receives an input signal, which is the encoded signal in this embodiment, and generates serial data (also referred to herein as "a data signal") and a recovery clock based on the input signal. The recovery clock may be used for operation of the serial-to-parallel converter 2, the decoder 3, the first comparator 51, the second comparator 52, the first counter 53, and the second counter 54. It may also be possible to generate a clock signal using a different circuit for operation of these components.

Figure 5:
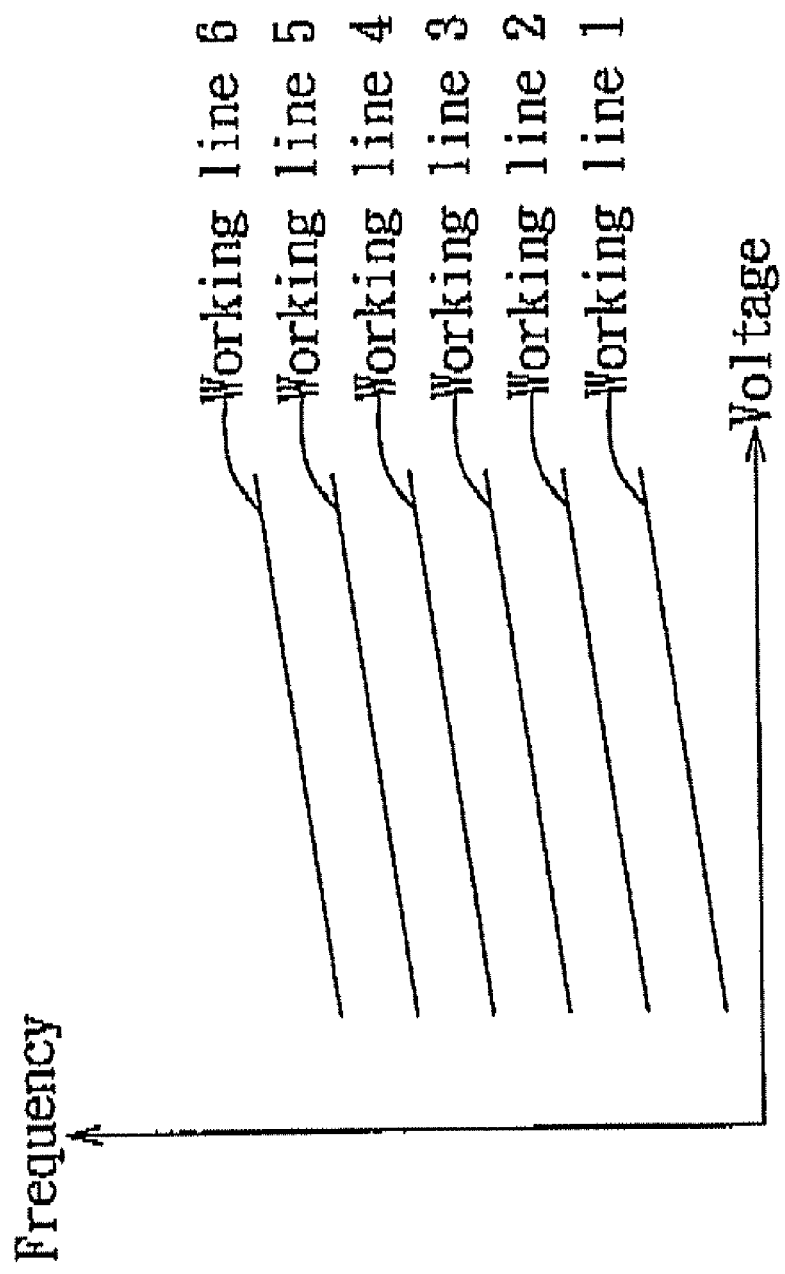
FIG. 5 is a graph, illustrating working lines of a voltage-controlled oscillator according to a preferred embodiment of the present invention.

The recovery circuit 1 may be realized in many ways to extract the recovery clock. In this embodiment, the recovery circuit 1 is realized by a voltage-controlled oscillator (VCO) 11 and a frequency adjustor 12. As shown in FIG. 5, the VCO 11 has a plurality of working lines. The following assumptions and designations are made to aid in the description of the recovery circuit 1 of this embodiment: a transmitter 91 transmits the encoded signal according to a transmitter clock, a ratio between a transmitter clock frequency ($F_T$) and a crystal clock frequency ($F_X$) generated by the VCO 11 is ($RA_T$), and a ratio between a recovery clock frequency ($F_R$) and the crystal clock frequency ($F_X$) is ($RA_R$). When the recovery clock frequency ($F_R$) is adjusted by the VCO 11, and the adjustor 12 determines that the ratio ($RA_R$) is higher than the ratio ($RA_T$), this indicates that the recovery clock frequency ($F_R$) is too high. On the other hand, if the ratio ($RA_R$) is smaller than the ratio ($RA_T$), this indicates that the recovery clock frequency ($F_R$) is too low.

The adjustor 12 performs one of four possible processes after determining the relation between ($RA_T$) and ($RA_R$). In the first process, the adjustor 12 directly selects an appropriate one of the working lines of the VCO 11 to accelerate converging of the recovery clock to an ideal frequency value. In the second process, the adjustor 12 notifies an external determining circuit 92 of the relation between the ratios ($RA_T$) and ($RA_R$), after which the determining circuit 92 selects an appropriate one of the working lines of the VCO 11 for frequency adjustment. In the third process, the adjustor 12 notifies the synchronization determining circuit 400 to of the relation between the ratios ($RA_T$) and ($RA_R$), after which the synchronization determining circuit 400 selects an appropriate one of the working lines of the VCO 11 for frequency adjustment. In the fourth process, if the VCO 11 is unable to perform frequency adjustment according to one of the working lines such that the recovery clock approximates the transmitter clock frequency ($F_T$), the adjustor 12 will send a frequency change request to the transmitter 91. Subsequently, the transmitter 91 increases or decreases the transmitter clock frequency ($F_T$) such that the recovery clock that approximates the transmitter clock frequency ($F_T$) is expected to fall within the scope of the working lines of the VCO 11.

The serial-to-parallel converter 2 converts the serial data into parallel data having a width of 10 bits. Next, the decoder 3 processes the parallel data so as to generate a processed signal. If the decoder 3 is an ANSI 8B/10B decoder, then the processed signal is a decoded signal having a width of 8 bits. Moreover, when the recovery clock is synchronized, the serial data includes a synchronous pattern of D10.2 (i.e., 10'b 0101010101), and a first reference value (8'h 4A) is a first decoded signal of one of the synchronous patterns, while a second reference value (8'h B5) is a second decoded signal of one of the synchronous patterns. (The notation "8'h 4A", for example, refers to a hardware description language notation where "h" represents a "hexadecimal" number, "8" represents the width of the number in bits, and "4A" represents the value of the hexadecimal number.)

In this embodiment, the synchronous pattern is 10'b 0101010101, and so the ANSI 8B/10B decoding value thereof is substantially the first reference value (8'h 4A). However, in view of differences in receiving state which occur due to shift, the decoding value of 10'b 1010101010 (i.e., the second reference value, 8'h B5) is also included in the circuit design. However, the objects of the present invention may be achieved by utilizing only the first reference value (8'h 4A) or the second reference value (8'h B5).

The comparison unit 4 determines the synchronization state of the recovery clock according to the decoded signal and the first reference value and/or the second reference value, and generates a first comparison signal and/or a second comparison signal that represents the result of this determination. The determining unit 5 generates a synchronization state signal, which represents the obtained synchronization state of the recovery clock, based on the first comparison signal and/or the second comparison signal.

Within the comparison period ($T_{cmp}$), if the first comparator 51 determines that the decoded signal is not the same as the first reference value (8'h 4A), then a first comparison signal is generated. The first counter 53 adjusts a first counter value stored therein according to the first comparison signal. In this embodiment, each adjustment of the first counter value involves incrementing the same by 1. If the second comparator 52 determines that the decoded signal is not the same as the second reference value (8'h B5), then a second comparison signal is generated. The second counter 54 adjusts a second counter value stored therein according to the second comparison signal. In this embodiment, each adjustment of the second counter value involves incrementing the same by 1.

Next, during the determining period ($T_{determine}$), the first and second determining modules 55, 56 check the results of the first and second counters 53, 54, respectively, and cause the deciding module 57 (realized by an AND gate in this embodiment) to output a synchronization state signal that represents the synchronization state of the recovery clock. When the first determining module 55 determines that the first counter value of the first counter 53 is smaller than a threshold value (N), the first determining module 55 generates a first determining message representing the synchronization state of the recovery clock so as to indicate that the synchronization state has been reached. When the second determining module 56 determines that the second counter value of the second counter 54 is smaller than the threshold value (N), the second determining module 56 generates a second determining message representing the synchronization state of the recovery clock so as to indicate that the synchronization state has been reached.

Subsequently, the deciding module 57 generates a synchronization state signal (with a value of 1) for indicating that a synchronization state of the recovery clock has been achieved according to the first determining message and/or the second determining message. At this time, the frequency and phase of the recovery clock are synchronous with those of the transmitter clock. When any one of the first counter value and the second counter value is not smaller than the threshold value (N), the synchronization state signal has a value of 0, indicating that a synchronization state of the recovery clock has not been achieved (i.e., the recovery clock is not synchronous with the transmitter clock). In other embodiments, the deciding module 57 can be configured to determine the synchronization state of the recovery clock directly on the basis of the first counter value and the second counter value, in which case the first and second determining modules 55, 56 may be omitted from the configuration of the determining unit 5.

In greater detail, when the synchronization determining circuit 400 determines that the decoded signal is the same as the first reference value (8'h 4A) and/or the second reference value (8'h B5), the recovery clock is determined to be in the synchronization state. Otherwise, the recovery clock is determined to not be in the synchronization state.

It is to be noted that the synchronization determining circuit 400 may be realized through other configurations. For instance, an operational procedure opposite to that described in the aforementioned embodiment may be utilized to achieve the same effect. In such a case, the deciding module 57 is realized by an OR gate. Furthermore, the threshold value (N) may be adjusted as needed.

The opposite operational procedure mentioned above is performed in the following manner. When the first comparator 51 determines that the decoded signal is the same as the first reference value, the first counter 53 increments the first counter value, and when the first determining module 55 determines that the output of the first counter 53 is larger than a threshold value (M), the first determining message indicates achievement of the synchronization state of the recovery clock. The second determining message is obtained through the second comparator 52, the second counter 54, and the second determining module 56 in a similar manner.

The principles behind realizing a synchronization state of the recovery clock will now be described. If a correct synchronous pattern is more or less decodable, then a frequency locking state is sure to be reached. This is due to the fact that accurate decoding is possible only when the recovery clock frequency matches the transmitter clock frequency. Moreover, this also implies that a phase locking state is reached since if a transition point (rising edge or falling edge) of the recovery clock takes place in the transition period of the decoded signal, decoding will be erroneous.

Moreover, the bit error rate expected by the synchronization determining circuit 400 can be configured by adjustment of the determining period ($T_{determine}$) and the threshold value (N). For example, when the requisite bit error rate is $2^{-9}=(10N)/(T/10t_{bit})$, this indicates that only at most (10N) error bits are tolerated for each ($T/10t_{bit}$) input bits, where ($t_{bit}$) is the inverse of the bit rate of the encoded signal and 10 is the bit width of the parallel data.

In addition, it is to be stressed that in a DisplayPort system, an encoded signal does not carry a synchronous pattern ending message. The transmitter 91 uses an auxiliary (AUX) channel to notify the receiver 93 of whether a synchronous pattern is currently being sent (in the same manner as the comparison request transmitted by the signal swing detecting unit 6), and the receiver 93 also uses the AUX channel for transmitting a synchronization locking state to the transmitter 91 for use by the transmitter 91 to send a synchronous pattern. Therefore, when the present invention is implemented in a DisplayPort system, the signal swing detecting unit 6 may be omitted from the configuration of the receiver 93 of this invention.

It should be noted herein that although the preferred embodiment is described in relation to ANSI 8B/10B encoding signals and ANSI 8B/10B decoders, the present invention is not limited in this respect and may be applied to other types of encoding signals having synchronous patterns and corresponding decoders. Moreover, it is further noted that the synchronization determining circuit 400 may be disposed as an independent component outside of the receiver 93. Furthermore, in some embodiments, the decoder 3 may be merged into the synchronization determining circuit 400.

In sum, by detection of the number of times that received decoded signals are classified into and not classified into synchronous patterns during each determining period ($T_{determine}$) by the synchronization determining circuit 400, the receiver 93 of this invention may effectively determine the frequency locking and phase locking states of the recovery clock, and hence, the purpose of this invention is achieved.

With the invention thus explained, it is apparent that various modifications and variations can be made without departing from the spirit of the present invention. It is therefore intended that the invention be limited only as recited in the appended claims.

What is claimed is:

1. A receiver comprising:
   a data recovery circuit for receiving an input signal, and generating a data signal and a recovery clock;
   a processing circuit, coupled to said data recovery circuit, for processing the data signal to generate a processed signal; and
   a determining circuit for determining a synchronization state of the recovery clock according to the processed signal and at least one reference value;
   wherein the data signal includes a synchronous pattern, and the at least one reference value corresponds to at least a portion of the synchronous pattern;
   wherein the determining circuit includes:
      a comparator for comparing a portion of the processed signal and the at least one reference value;
      a counter for generating a counter value according to the comparison result generated by said comparator; and
      a determining module for generating the synchronization state of the recovery clock according to the counter value.

2. The receiver of claim 1, wherein said processing circuit includes a decoder, and the processed signal is a decoded signal;
   wherein when said determining circuit determines that at least a portion of the decoded signal corresponds to the at least one reference value, said determining circuit determines that the recovery clock is in the synchronization state.

3. The receiver of claim 2, wherein said decoder is an American National Standards Institute (ANSI) 8B/10B decoder.

4. The receiver of claim 1, wherein said processing circuit includes a serial-to-parallel converter, wherein said serial-to-parallel converter converts the data signal into parallel data having a width of 10 bits.

5. The receiver of claim 1, wherein the synchronous pattern comprises 10'b 0101010101.

6. The receiver of claim 5, wherein the at least one reference value comprises at least one of 8'h 4A and 8'h B5.

7. The receiver of claim 1, further comprises:
   a swing detector for detecting a position of the synchronous pattern in the data signal.

8. A method for determining a synchronization state of a recovery clock of an input signal, said method comprising:
   receiving the input signal;
   generating a data signal and the recovery clock according to the input signal;
   decoding the data signal to generate a decoded signal; and
   determining the synchronization state of the recovery clock according to at least one portion of the decoded signal and at least one reference value;
   wherein the data signal includes a synchronous pattern, and said at least one reference value includes a first reference value which corresponds to at least a portion of a first value in the synchronous pattern generated through decoding;
   wherein said step of determining includes comparing the at least one portion of the decoded signal and the first reference value to generate a first comparison result;
   wherein said step of determining further includes comparing the at least one portion of the decoded signal and a second reference value to generate a second comparison result; and
   wherein said at least one reference value further includes the second reference value which corresponds to at least a portion of a second value in the synchronous pattern generated through decoding.

9. The method of claim 8, wherein said step of determining further includes:
   counting the first comparison result to generate a first counter value;
   counting the second comparison result to generate a second counter value; and
   determining the synchronization state of the recovery clock according to the first and second counter values.

10. The method of claim 8, wherein said step of determining further includes:
    determining the synchronization state of the recovery clock according to the first and second comparison results.

11. The method of claim 8, further comprising:
    detecting a position of the synchronous pattern in the data signal.

12. The method of claim 8, wherein the synchronous pattern comprises 10'b 0101010101.

13. The method of claim 12, wherein the first reference value comprises at least one of 8'h 4A and 8'h B5.

14. A receiver comprising:
    a data recovery circuit for receiving an input signal, and generating a data signal and a recovery clock;
    a processing circuit, coupled to said data recovery circuit, for processing the data signal to generate a processed signal; and
    a determining circuit for determining a synchronization state of the recovery clock according to the processed signal and a first reference value;
    wherein the data signal includes a synchronous pattern, and the first reference value corresponds to at least a portion of the synchronous pattern;
    wherein the synchronous pattern comprises 10'b 0101010101; and
    wherein the first reference value comprises at least one of 8'h 4A and 8'h B5.

15. The receiver of claim 14, wherein the processing circuit includes a decoder, and the processed signal is a decoded signal;
    wherein, when said determining circuit determines that at least a portion of the decoded signal corresponds to the first reference value, the determining circuit determines that the recovery clock is in the synchronization state; and wherein the decoder is an American National Standards Institute (ANSI) 8B/10B decoder.

16. The receiver of claim 14, wherein the processing circuit includes a serial-to-parallel converter, wherein the serial-to-parallel converter converts the data signal into parallel data having a width of 10 bits.

17. The receiver of claim 14, wherein the determining circuit includes:
- a first comparator for comparing a portion of the processed signal and the first reference value;
- a first counter for generating a first counter value according to the comparison result generated by the first comparator; and
- a first determining module for generating the synchronization state of the recovery clock according to the first counter value.

18. The receiver of claim 17, wherein the determining circuit further includes:
- a second comparator for comparing a portion of the processed signal and a second reference value;
- a second counter for generating a second counter value according to the comparison result generated by the second comparator; and
- a second determining module for generating the synchronization state of the recovery clock according to the second counter value.

19. The receiver of claim 18, wherein the determining circuit further includes a deciding module, coupled to the first determining module and the second determining module, for providing a synchronization state signal.

20. The receiver of claim 14, further comprising a swing detector for detecting a position of the synchronous pattern in the data signal.

* * * * *